(12) United States Patent
Gonsalves (10) Patent No.: US 8,311,975 B1
(45) Date of Patent: Nov. 13, 2012

(54) DATA WAREHOUSE WITH A DOMAIN FACT TABLE

(76) Inventor: Allan Michael Gonsalves, San Jose, CA (US)

( * ) Notice: Subject to any disclaimer, the term of this patent is extended or adjusted under 35 U.S.C. 154(b) by 152 days.

(21) Appl. No.: 13/037,034

(22) Filed: Feb. 28, 2011

(51) Int. Cl.
  *G06F 17/30* (2006.01)
(52) U.S. Cl. ........................................... 707/606
(58) Field of Classification Search .................. 707/2, 3, 707/200, 606
  See application file for complete search history.

(56) References Cited

U.S. PATENT DOCUMENTS

| | | | |
|---|---|---|---|
| 5,940,818 A | 8/1999 | Malloy et al. | |
| 5,943,668 A | 8/1999 | Malloy et al. | |
| 5,978,788 A | 11/1999 | Castelli et al. | |
| 6,493,728 B1 | 12/2002 | Berger | |
| 7,315,849 B2 | 1/2008 | Bakalash et al. | |
| 2003/0055832 A1 | 3/2003 | Roccaforte | |
| 2006/0173926 A1* | 8/2006 | Kornelson et al. | 707/200 |
| 2006/0259507 A1* | 11/2006 | Higuchi | 707/102 |
| 2007/0061287 A1 | 3/2007 | Le et al. | |
| 2007/0118524 A1 | 5/2007 | Farmer | |
| 2009/0240663 A1 | 9/2009 | Plattner et al. | |

OTHER PUBLICATIONS

D. Walker, Overview Architecture for Enterprise Data Warehouses, White paper from Data Management and Warehousing, Jan. 3, 2006.
Invention/Technology Evaluation Results from Lambert & Lambert, Inc., Dec. 14, 2010.

* cited by examiner

*Primary Examiner* — Etienne LeRoux
(74) *Attorney, Agent, or Firm* — Douglas L. Waller (57) ABSTRACT

A data warehouse includes a plurality of master data tables. The master data tables include surrogate identifiers. Each surrogate identifier (SID) identifies a master data table domain inside a master data table from the plurality of master data tables. A plurality of dimension tables use the surrogate identifiers to link to the master data table domains within the master data tables. A fact table stores dimension identifiers (DIM IDs) that provide links to the dimension tables. A domain fact table stores aggregated data aggregated from data stored in the master data tables. The aggregated data is accessible from the domain fact table using surrogate identifiers, without using DIM IDs stored in the fact table.

20 Claims, 6 Drawing Sheets

DATA WAREHOUSE WITH A DOMAIN FACT TABLE

BACKGROUND

A data warehouse is a repository of an organization's electronically stored data, designed to facilitate reporting and analysis. It is also a nonvolatile data repository that houses large amounts of historical data. Data warehousing and associated processing mechanisms, such as Online Analytical Processing (OLAP), Relational OLAP (ROLAP), Multidimensional OLAP (MOLAP), and Hybrid OLAP (HOLAP), are common technologies used to support business decisions and data analysis. There are two leading approaches used to store data in a data warehouse—the dimensional approach and the normalized approach.

In a dimensional approach, transaction data are partitioned into either "facts", which are generally numeric transaction data such as net sales, quantity sold, gross sales, etc, or "dimensions", which are the reference information that gives context to the facts. In the normalized approach, the data in the data warehouse are stored following, to a degree, data normalization rules. Tables are grouped together by subject areas that reflect general data categories, such as data on customers, products, finance, etc. Dimensional approaches can involve normalizing data to a degree.

Dimensional data warehouses and data marts sometimes use tables logically arranged in a star schema or snowflake schema. The snowflake schema is represented by centralized fact tables that are connected to multiple dimension tables or dimensions are normalized into multiple related tables or sub-dimension tables. Each dimensional table represents a data dimension of the warehouse. All the data for a data dimension can be stored in the associated dimension table, or can be stored in one or more master data tables associated with the dimension table. A typical objective when using the snowflake schema is to remove low cardinality attributes from a dimension table and place these attributes in a secondary dimension table.

In a snowflake schema, the master data tables can all be directly connected to an associated dimension table, or can be arranged more elaborately with multiple levels of master data tables arranged connected in parent and child relationships, and where child tables may have multiple parent tables, thus resulting in a complex snowflake like arrangement. The term "Master Data" means the enterprise-spanning set of data arising or processed within all of the enterprise's primary business entities and functions. For example, in supply chain applications, master data includes product identifiers and details, suppliers, components, inventory, costs, and so on.

A Systems, Applications and Products in Data Processing (SAP), business intelligence warehouse, available from SAP America, Inc., is a data warehouse system that fully utilizes snowflake schema, enabling users to analyze data from operative SAP applications, as well as other business applications. In this context, OLAP technology enables multi-dimensional analysis from various business perspectives.

When a query, i.e., a request for reporting data, is sent to a dimensional data warehouse, the query being based on data stored in a master data table, the master data table is searched to obtain the master data table identifier for the data. The master data table identifier is often referred to as a surrogate identifier (SID). Once the surrogate identifier for the data has been obtained, data to fulfill the query can be obtained from tables in the data warehouse. This data may be located, for example, in a fact table, one or more dimension tables, and one or more master data tables.

When reporting data is requested from a data warehouse, the system searches master data first, then gets the dimension identifiers from dimension tables that are linked and then gets the data from a fact table. The dimension tables thus provide a platform to store numeric identifiers that link data between a fact table and master data tables. Due to the large volume of dimension tables, searching and obtaining appropriate data links between a fact table and a master data table can be a relatively time consuming process. Though the sheer volume can be very high, the proper organization of data can be helpful to ensure timely retrieval of valuable information.

SUMMARY

In accordance with embodiments of the present invention, a data warehouse includes a plurality of master data tables. The master data tables include surrogate identifiers. Each surrogate identifier (SID) identifies a master data table domain inside a master data table from the plurality of master data tables. A plurality of dimension tables use the surrogate identifiers to link to the master data table domains within the master data tables. A fact table stores dimension identifiers (DIM IDs) that provide links to the dimension tables. A domain fact table stores aggregated data aggregated from data stored in the master data tables. The aggregated data is accessible from the domain fact table using surrogate identifiers, without using DIM IDs stored in the fact table.

DESCRIPTION OF THE EMBODIMENT

Figure 1:
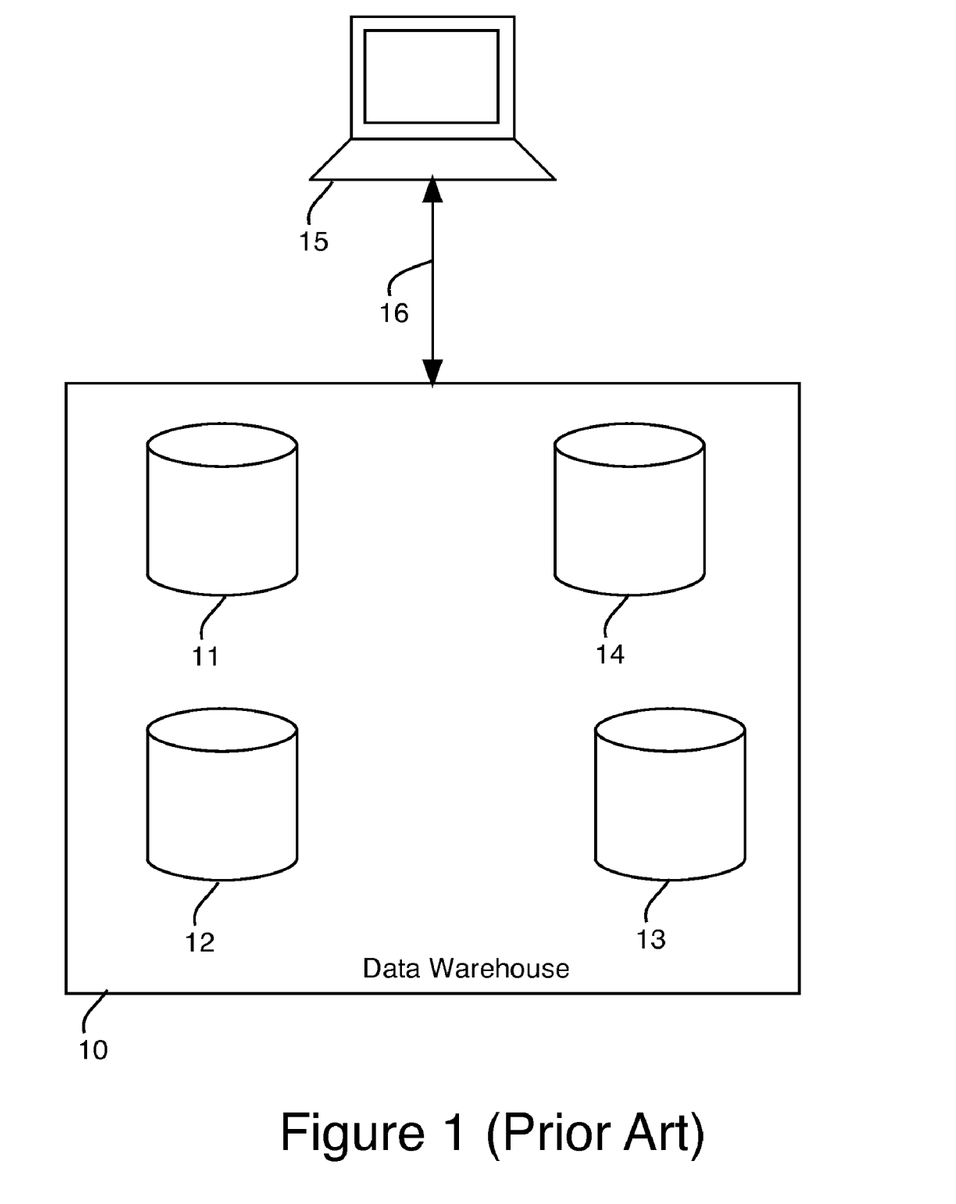
FIG. 1 is a simplified block diagram illustrating a computing system making queries to a data warehouse.

FIG. 1 is a simplified block diagram illustrating connection of a computer system 15 with a data warehouse 10. A data warehouse is organized to meet the need for reliable, consolidated, unique and integrated reporting and analysis, at different levels of aggregation, of the data for an organization. A data warehouse is typically made up of a collection of one or more data repositories. This is illustrated in FIG. 1 by data warehouse 10 including a data repository 11, a data repository 12, a data repository 13 and a data repository 14. For example, data repository 11 includes customer details, data repository 12 includes employee files, data repository 13 includes sales and manufacturing information, data repository might 14 includes financial data. Other data, such as financial information, can be stored in additional data repositories.

Data warehouse 10 integrates the data system to facilitate the answer of data queries from a user of the data warehouse. This is illustrated in FIG. 1 by arrow 16 which represents a user on computer 15 making a query into data warehouse 10 and obtaining a reply.

Figure 2:
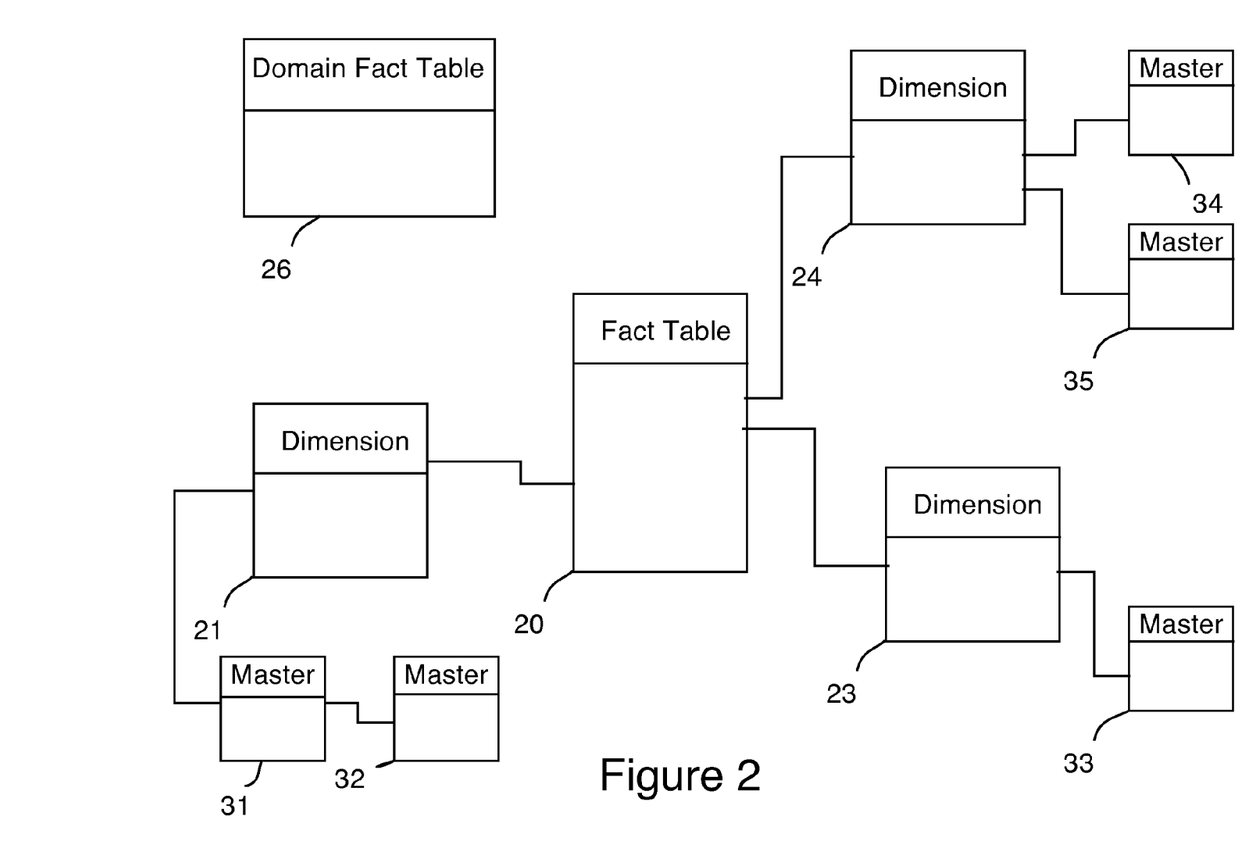
FIG. 2 shows data in data warehouse being arranged in a multiple dimensional snowflake schema with an additional domain fact table in accordance with an embodiment of the invention.

FIG. 2 gives additional information about how data warehouse 10 is organized. In this example, data warehouse 10 is organized in a snowflake schema. In the snowflake schema a centralized fact table 20 is connected to multiple dimension tables, represented in FIG. 2 by a dimension table 21, a dimension table 23 and a dimension table 24. Each dimensional table represents a data dimension of the warehouse. For example, the dimension represented by dimension table 21 is for the customer information stored in data repository 11. The dimension represented by dimension table 23 is for the sales information stored in data repository 13. The dimension represented by dimension table 24 is for the financial information stored in data repository 14. Another dimension (not shown) is for the employee information stored in data repository 12.

While dimension tables can store user generated data, often times dimension tables are used primarily to store surrogate identifiers that point to user data stored in the master tables associated with the dimension table. For example, customer information is stored in a master table 31 and a child master table 32 of master table 31, not directly in dimension table 21. Sales information is stored in a master table 33. Product and manufacturing information is stored in a master table 34 and a master table 35.

FIG. 2 is only meant to be illustrative of the organization of a data warehouse. A typical data warehouse may be much more complex than is shown by FIG. 2 while still conforming to the overall snowflake schema represented in FIG. 2.

In a typical snowflake schema, each data entry in a fact table will reference one or more dimension identifiers (DIM IDs) into a dimension table data entry. Each data entry in a dimension table will be stamped for identification with a DIM ID and will contain one or more surrogate identifiers (SIDs) into a master table data entry. Each data entry in a master table will be stamped for identification with an SID and will contain data entries such as attributes, navigational attributes, compound attributes, hierarchy IDs and text IDs. Additional data entries provide more information about the master data.

Data warehouses, such as data warehouse 10, are generally organized to provide operational level reporting. This does not always efficiently meet the reporting needs of high level management which is often more interested in tracking a few key performance indicators. Key performance indicators are typically used to measure the overall high-level progress of an organization or a company. Examples of key performance indicators can be, for example, gross sale by customer, gross sale by product, gross sale by region, gross sale by nation, net revenue per quarter, top ten customer report, top ten product report, and so on.

Because data warehouse 10 stores a lot of information in addition to the key performance indicators, the overhead and processing time required to assemble reports on key performance indicators can be very high. To reduce the processing time and overhead for producing such key performance indicators, data warehouse 10 can include a domain fact table 26.

Domain fact table 26 is used to aggregate transaction data that is then stored at master data object level. For example, the aggregated data are key performance indicators defined to provide reports to high level management of a company. The aggregation level can be defined and generated to meet specific reporting needs to report on a specific application data set. The application data set can be, for example, related to sales and distribution, production planning, financial planning or reporting and so on. For example, domain fact table 26 stores a selective set of master data from either one or multiple application sets that helps to meets reporting requirements of a user. The user in essence is allowed to create his or her own reporting world or domain. The domain need not store all the master data object details that are available in the application data set into a domain fact table.

Data in domain fact table 26 are stored and accessed based on surrogate IDs (SIDs) and key performance indicators (KPIs). Dimension identifiers (DIM IDs) are not used when accessing data from domain fact table 26. This facilitates expedited access and retrieval of data queries to domain fact table 26 because the existence of data in domain fact table 26 makes unnecessary the access of the underlying tables within data warehouse 10 that store all the operational details not desired when accessing key performance indicators. For example, operation details may include details that high level management does not use to measure the performance of the company, such as details of sales order documents and documents pertaining to details of production planning. Use of domain fact table 26 also obviates the requirement of searching DIM IDs in the dimension tables that, without domain fact tables, is required as a data linkage bridge between fact and master data tables that can assist in accessing key performance indicator from the fact table for the respective master data from master data table.

Figure 3:
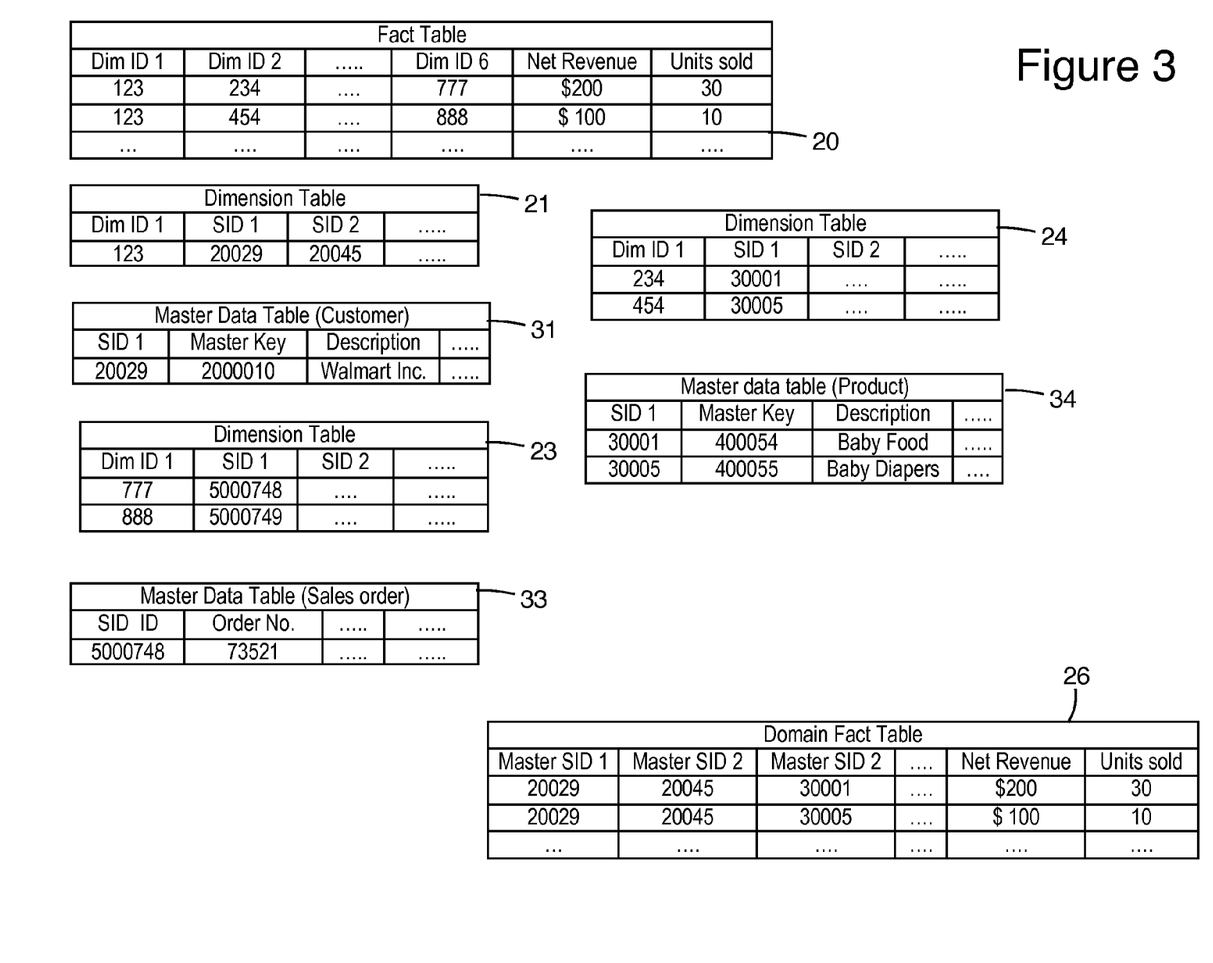
FIG. 3 is a simplified example of tables within a data warehouse in accordance with an embodiment of the invention.

FIG. 3 is a simplified example illustrating the arrangement of data within tables within data warehouse 10. In the specific case shown in FIG. 3, master table 31 is shown to contain specific information about customers. This information, only partially shown in FIG. 3, can include, for example, the name of the customer, the city in which the customer is located, customer address and so on. Master data table 34 is shown to contain specific information about products. Master data table 33 is shown to contain specific information about sales orders.

In order to obtain information from fact table 20 for the customer located in master data table 31, a SID ID is obtained from master data table 31. The DIM ID is accessed from dimension table 21 based on the SID id obtained from master data table 31. Fact table data is then obtained from fact table 20 based on the DIM ID obtained above from dimension table 21. Likewise, to obtain information from fact table 20 such as 'net revenue' amount for product located in master data table 34, a SID ID is obtained from master data table 34, then a DIM ID is obtained from dimension table 24 for the SID ID obtained above from master data table 34. Once the DIM ID, is found then fact data table 20 is searched for that DIM ID to obtain net revenue for the product. Likewise, to obtain sales order information such as 'units sold' from fact table 20, a SID ID is obtained from master data table 33, then dimension table is searched to obtain a DIM ID in the dimension table 23 for the SID ID obtained from master data table 33. Once the DIM ID is found in dimension table 23, then fact table 20 is searched for that DIM ID to obtain 'units sold'.

For example, domain fact table 26 aggregates pertinent operational details and store it at master data level thereby significantly reducing the data record width, columns and level of granularity actually stored in domain fact table 26. For example, typical technical definition of sales order document may consists of multiple line items to detail out sales related information of each product that has been sold by a company to customer(s) for a certain sale price on a certain date thereby forming a complete and unique sales order document. In this specific example, operation details might include the sales document number, the line item number, the delivery address, delivery terms, the shipping address, the payment terms, billing address, etc. can be regarded as operational details. The customer and the product can be referred to as master data. The sale price, the product price and/or the net revenue can be referred to as key performance indicators. Domain fact table 26 will store only master data and key performance indicators so as to meet specific reporting needs of high level management. Typically, high level management may not want to know all the data included in a sales document data row. A sales document data row typically is made up of 80% operational details, 15% master data details and 5% key performance indicator details. Domain fact table 26 stores only a fraction of the data in the sales document data row, which allows fast response time when accessing data from domain fact table 26.

For example, a user may want to find out how much net revenue was generated by a company by selling baby diapers to a particular customer. As illustrated by FIG. 3, when a query requests this information from domain fact table 26, surrogate ID (SID) 20029 is obtained from table 31 for customer key 2000010 which is Company X, as specified by the user in the query selection parameter. Also obtained is SID 30005 of product master data key 400055 which is baby diaper from table 34. Typically queries are run with a specific set of selection parameters in order to read reporting data from the data warehouse. Once both SIDs are obtained, then net revenue is obtained directly from table 26 for value of SIDs 20029 and 30005. The result of $100 as net revenue is returned to the user as output. The entire process responding to the query required three data read statements or search steps to obtain net revenue information from domain fact table. Responding to the query without accessing domain fact table might typically require five search steps to obtain same result. That is, the system responding to the query would first obtain SID 20029 from table 31 for the customer master data key 2000010 which is Company X Inc. The system would also obtain SID 30005 for product master data key 400055 which is baby diaper from table 34 and then obtain dimension id (DIM ID) 123 for respective SID 20029 from table 21. Then the system would obtain dimension ID 454 for respective SID 30005 from table 24. Finally, the system would obtain net revenue from table 20 for DIM IDs 123 and 454 to obtain the result of $100 as net revenue.

In accordance with embodiments of the present invention, domain fact table 26 stores SID IDs with key performance indicators such as 'net revenue'; 'units sold' at one place, thereby allowing links between fact table 20 and master data tables 31, 33, 34 to be obtained without searching dimension tables 21, 24 and 23. Since a typical snowflake schema consists of many dimension tables, obviating the need to search dimension tables can result in significant time savings for searches performed to satisfy the reporting needs of high level management.

Figure 4:
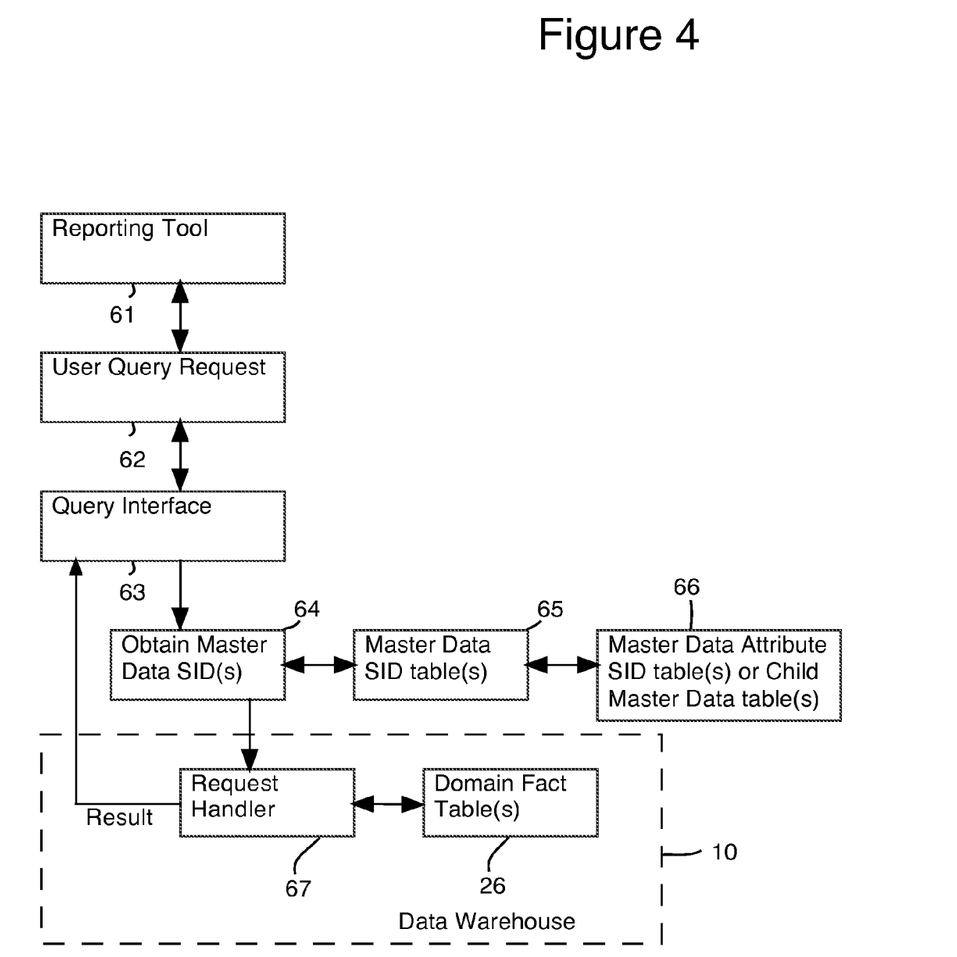
FIG. 4 illustrates processing of a query into a domain fact table in accordance with an embodiment of the invention.

FIG. 4 illustrates a processing of a query to obtain information from domain fact table 26. A user accesses a reporting tool 61 to make a request for data. A user query request 62 is processed by a query interface 63. If the query is for information stored in domain fact table 26, in a block 64, one or more master data SIDs needed to respond to the query are obtained. The one or master data SIDs are obtained from one or more master data SID tables 65. Additionally, as represented by block 66, if required one or more master data attribute SID tables can be accessed. Also, one or more child master data table can be accessed.

Once the one or more master data SIDs are obtained, a request handler 67 within data warehouse 10 uses the one or more master data SIDs to access the requested data from domain fact table 26. Request handler 67 returns the requested data through query interface 63 back to reporting tool 61.

Figure 5:
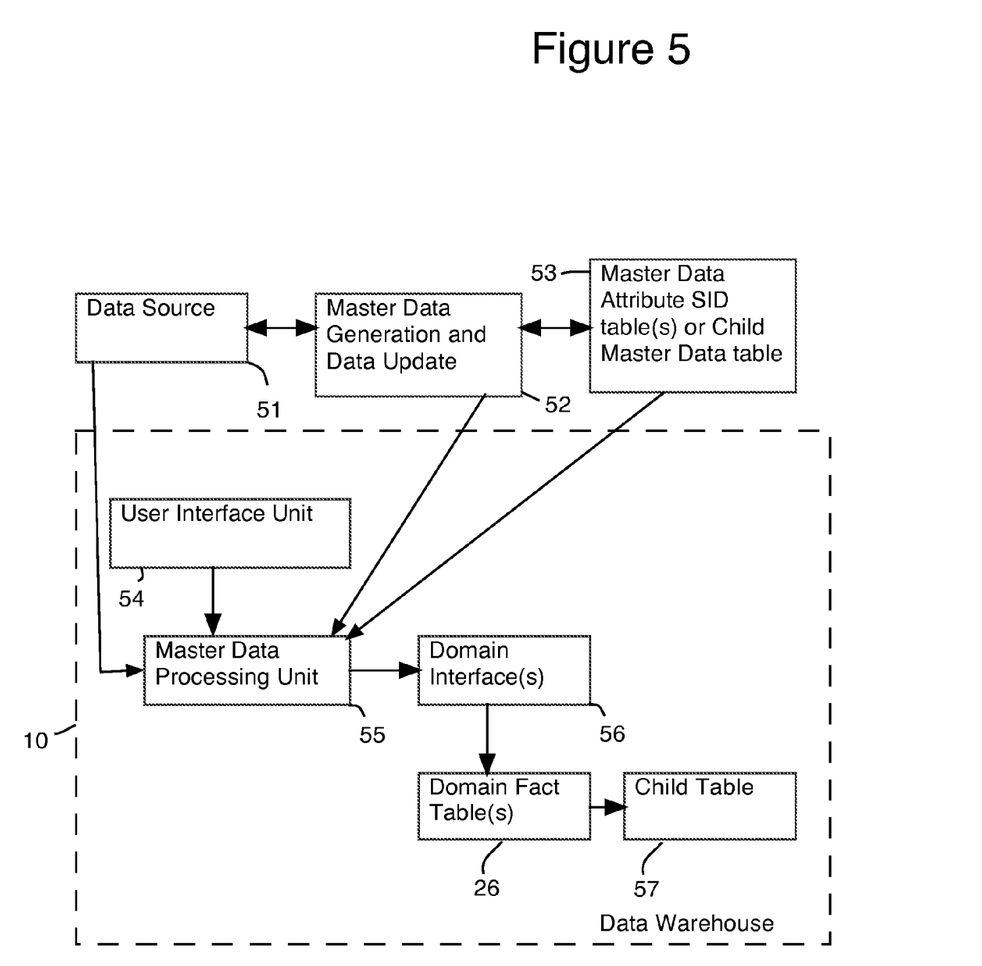
FIG. 5 illustrates processing and insertion of data into a domain fact table in accordance with an embodiment of the invention.

FIG. 5 illustrates processing and insertion of data into domain fact table 26. A user interface 54 is used by a user to set up technical definitions, a data processing approach and business rules to be followed during the population of domain fact table 26 with data. For example, the technical definitions can include the definition of domain fact table 26, including technical name, generation requirements, authorization requirements and so on. The technical definitions can also include setting up a domain interface 56 for the domain fact table and object level assignments linking a domain fact table to a domain interface. Data processing approach indicates details of data source whether data for a domain fact table 26 is obtained from a source external from data warehouse 10 or whether the data is obtained from within tables already existing in data warehouse 10. Business rules can include data load scheduling options such as setting up the definition of an event to automate data loading process (based on, for example trigger data load at certain date and time etc.) and a method of execution (for example, foreground data load job or background data load job). Business rules can also include rules for data archiving and data maintenance. Business rules also can include data loading methods, for example, a setting that data is to be loaded as a full load, where all data is erased and replaced, or as a delta load where changes in data rows are made without erasing all data in a row. Business rules may also provide an ability to perform overall data maintenance options for the domain fact table. The maintenance options can include, for example, deletion of corrupted data from domain fact table using the filter value of SIDs, thereby following typical data warehouse maintenance activities.

User interface 54 is also used to identify data objects (e.g., master data objects) and to set up validation rule and data filter conditions used for domain fact table 26. For example, identification of master data can includes all the master data objects that need to be stored in domain fact table to meet high level management reporting needs. User interface 54 is also used to determine if existing data from data warehouse 10 is to be populated from data already within data warehouse 10, or populated from an external data source.

A master data processing unit 55 processes data based on the business rules, the technical definitions and the data processing approach set up in user interface unit 54. Master data processing unit 55, for example, performs master data object validations, SID retrieval from within data warehouse 10, retrieval of data from existing tables that is to be aggregated into key performance indicators, obtain data from external sources that is required to be converted into SID data row by accessing required master data tables and key performance indicators and performing aggregation. Master data processing unit 55 operates in the background and is not directly accessible by a user.

For example, when master data processing unit 55 sets up a connection with a domain interface, master data processing unit 55 gets a master data object list from user interface unit 54. Master data definition and activation status is obtained from a master data definition table and validated. Based on the data processing approach received from user interface unit 54, master data processing unit 55 will form a runtime object. The runtime object typically consists of programming logic that is used to execute specific technical steps. If the existing data needs to be converted to domain fact table schema, then SIDs are obtained from master data tables for the objects identified in user interface unit 54 and key performance indicators are obtained from fact table 20.

Master data processing unit 55 builds a runtime object that builds technical logic to populate all master data objects and key performance indicator objects with values in rows of data within a domain fact table or progeny of a domain fact table. Master data processing unit 55 also aggregates data based on SIDs and when saved and activated, pushes the data through domain interface 56 for the final set of data manipulation before it is pushed to domain fact table 26 where the data will be stored. Data manipulation may include posting constant value for certain key performance indicator or building a small coding logic to modify value of key performance indicator. Data manipulation rules can be used to influence the key performance indicator value before it gets stored into domain fact table. User gets access to define data manipulation rules in domain interface 56.

A domain interface 56 is a bridge between a master data processing unit 55 and a domain fact table 26. When there are more than one domain fact tables, there can also be more than one domain interfaces, e.g., a dedicated domain interface can exist for each domain fact table. Domain interface 56 builds mapping rules between source objects obtained from master data processing unit 55 and target objects defined in domain fact table 26. Domain interface 56 also performs data manipulations. Domain interface 56 also can be used to fine tune data before the data is pushed to domain fact table 26. Domain interface 56 also handles exception scenarios and appropriate messaging or log generation.

User Interface unit 54 drives and controls activation and execution of master data unit 55 and overall end-to-end data movement from data source to domain fact table 26.

Domain fact table 26 is populated with master data SIDs and data aggregated, for example as key performance indicators, as selected by a user using user interaction unity 54. For example, a complete data row consists of an SID of the master data and key performance indicator. Operational level details such as sales order document information, purchase order document information are typically not stored in domain fact table 26. Example sales order document number can be defined as company's internal document that gives details on overall sales order process. Data in domain fact table 26 is accessed using master data SIDs without using DIM IDs.

A child master data table 57 is shown accessible from domain fact table 26. Domain fact tables can be parents of child master data tables and even grandchild tables in accordance with rules similar to snow flake schema, except however, that domain fact tables, their child tables and grandchild tables are accessed without use of DIM IDs. Domain fact tables are linked to child master data tables using SIDs, without use of DIM IDs. The child master data tables are shared by both the existing data warehouse snowflake schema and the domain fact table schema. The difference is that, in the standard data warehouse snowflake schema, child master data tables are connected to dimension tables using DIM IDs and in domain fact table-master data snowflake schema, child master data tables are connected directly with domain fact tables using SID ID. Thus, a new domain fact table-master data schema sits on top of existing data warehouse and does not employ dimension tables.

When populating data into domain fact tables defined using user interface unit 54, a data source 51 provides data to be placed into domain fact table 26. Data source 51 can be from data already within master data tables or dimension tables within data warehouse 10. Alternatively data source 51 can be an external data source from which data has been extracted, and transformed in preparation to be loaded within domain fact table 26. Following instructions from user interface unit 54, master data processing unit 55 will utilize master data generation and data update 52 and master data attribute SID tables or child master data table 53 to access SIDs and to read key performance indicators from a data source and then place the new data through domain interface 56 into domain fact table 26.

Figure 6:
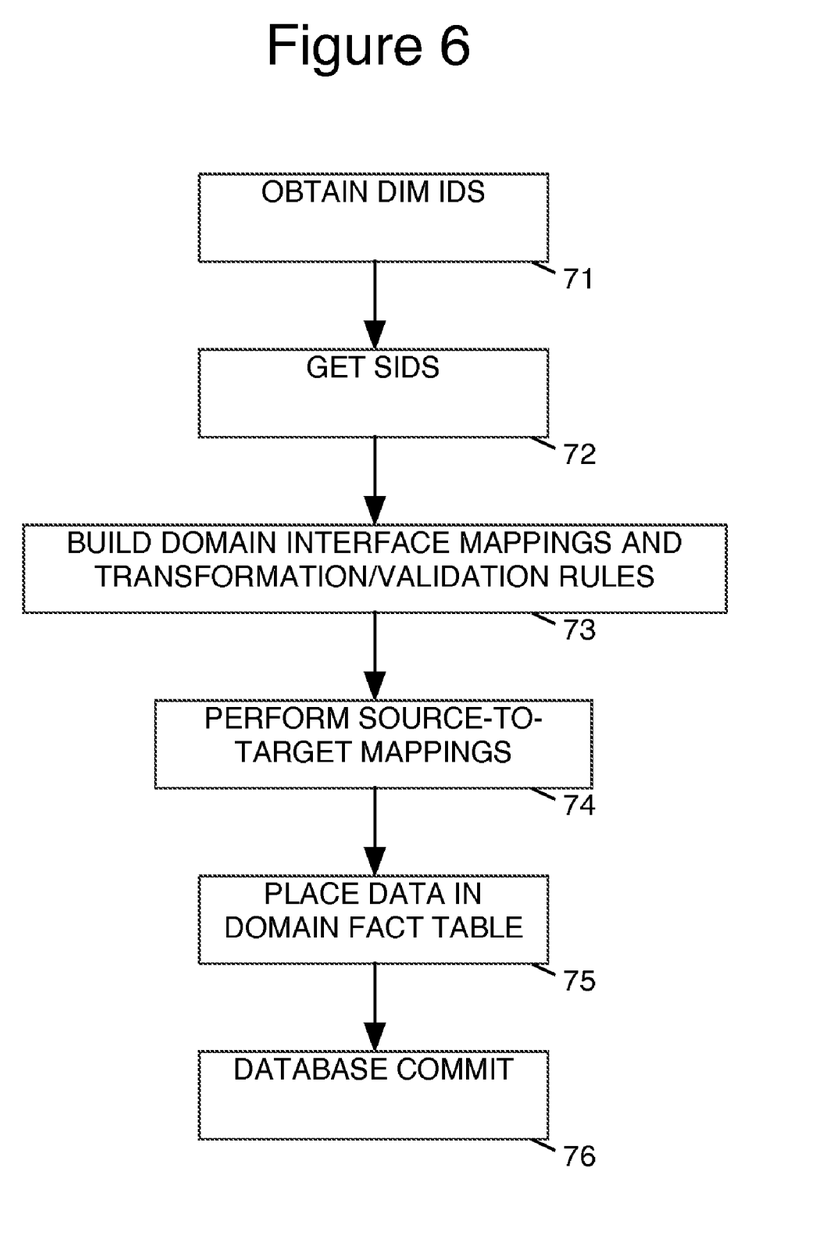
FIG. 6 summarizes a process to build a domain fact table in accordance with an embodiment of the invention.

FIG. 6 summarizes a process to build domain fact table 26. In a block 71, DIM IDs are obtained. When the domain fact table 26 is generated based on data existing in data warehouse 10, master data processing unit 55, based on controls defined in user interface unit 54, obtains the list of all dimension tables (and their technical details) associated with the fact table from which the data is obtained. Master data processing unit 55 then queries each of the dimension tables to obtain the DIM IDs. The DIM IDs are used to get key performance indicator information from the fact table. Dimension table also stores SIDs so that SIDs are used to link to master data tables to get the child master data details if required. When the domain fact table 26 is generated based on data external to data warehouse 10, master data processing unit 55, based on controls defined in user interface unit 54, queries master data tables based on master data keys obtained from user interface unit 54 to obtain the respective SID ID. At the same time, master data processing unit 55 also obtains the information of key performance indicator directly from data source, thereby forming data rows that consist of an SID ID and a key performance indicator.

In a block 72, the DIM IDs obtained in block 71 are used to get SIDs from underlying SID tables. This is a common task when domain fact table 26 is generated either from existing data warehouse 10 or based on data external to data warehouse 10.

In block 73, based on business rules defined in user interface unit 54, master data processing units 55 generates runtime objects to perform object level data manipulations in domain interface 56. Domain interface mappings are built. Also in block 73, data validations occur as well as the transformation of source data into a complete set of data row that is ready to move to the domain fact table with the mapping designed in block 74.

In a block 74, domain interface 56 is invoked to perform source-to-target object level mappings. The source is a list of objects that are available from a data source and the target is a list of objects defined in domain fact table 26. The mapping rules defines where each field of the source data gets mapped to the final objects in domain fact table 26.

In a block 75, based on source-to-target field mappings performed in block 74, SIDs obtained from block 72 and key performance indicators, obtained either from an external data source or from fact table 20 of existing data warehouse 10, will finally be placed into domain fact table 26. In a block 76, a database commit is performed, making the data in domain fact table 26 available for access.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

I claim:
1. A data warehouse comprising:
 a plurality of master data tables, the master data tables including surrogate identifiers, each surrogate identifier (SID) identifying a master data table domain inside a master data table from the plurality of master data tables;

a plurality of dimension tables, the dimension tables using the surrogate identifiers to link to the master data table domains within the master data tables;

a fact table, the fact table storing dimension identifiers (DIM IDs) that provide links to the dimension tables; and, a domain fact table, the domain fact table storing aggregated data aggregated from data stored in the master data tables, the aggregated data being accessible from the domain fact table using surrogate identifiers, without using DIM IDs stored in the fact table.

2. A data warehouse as in claim 1 wherein the aggregated data are arranged as key performance indicators tracked by high level management of a company.

3. A data warehouse as in claim 1, additionally comprising:
a user interface unit through which a user sets up technical definitions, data processing approach and business rules to be followed during the population of the domain fact table with data.

4. A data warehouse as in claim 1, additionally comprising:
a user interface unit through which a user sets up technical definitions, data processing approach and business rules to be followed during the population of the domain fact table with data; and,
a master data processing unit that processes data based on the business rules, the technical definitions and the data processing approach set up by the user interface unit.

5. A data warehouse as in claim 1, additionally comprising:
a user interface unit through which a user sets up technical definitions, data processing approach and business rules to be followed during the population of the domain fact table with data;
a master data processing unit that processes data based on the business rules, the technical definitions and the data processing approach set up by the user interface unit; and,
domain interface acting as a bridge between the master data processing unit and the domain fact table, the domain interface building mapping rules between the master data processing unit and the domain fact table, the domain interface also performing validations.

6. A data warehouse as in claim 5, wherein the domain fact table is one of a plurality of domain fact tables.

7. A data warehouse as in claim 5, wherein the domain fact table is one of a plurality of domain fact tables and the domain interface is one of a plurality of domain interfaces.

8. A data warehouse as in claim 5, wherein the domain fact table is one of a plurality of domain fact tables and the domain interface is one of a plurality of domain interfaces, each domain fact table in the plurality of domain fact tables being associated with a dedicated domain interface from the plurality of domain interfaces.

9. A data warehouse as in claim 1, additionally comprising:
a child master data table accessible from the domain fact table.

10. A data warehouse as in claim 1, wherein the domain fact table is one of a plurality of domain fact tables.

11. A data warehouse as in claim 1 wherein rows of data in the domain fact table consist of a surrogate identifier and a key performance indicator.

12. A data warehouse as in claim 1 wherein aggregated data comprises a selective set of master data from at least one application set that helps to meets reporting requirements of a user.

13. A method for organizing and accessing data in a data warehouse, the method comprising:

arranging the data in a plurality of master data tables, the master data tables including surrogate identifiers, each surrogate identifier (SID) identifying a master data table domain inside a master data table from the plurality of master data tables;

storing the surrogate identifiers in a plurality of dimension tables, the dimension table using the surrogate identifiers to link to the master data table domains within the master data tables;

storing dimension identifiers (DIM IDs) within a fact table, the (DIM IDs) providing links to the dimension tables; and, storing, in a domain fact table, aggregated data aggregated from a subset of the data stored in the master data tables, the aggregated data being accessible from the domain fact table using surrogate identifiers, without using DIM IDs stored in the fact table.

14. A method as in claim 13, additionally comprising:
providing a user interface unit through which a user sets up technical definitions, data processing approach and business rules to be followed during the population of the domain fact table with data.

15. A method as in claim 13, additionally comprising:
providing a user interface unit through which a user sets up technical definitions, data processing approach and business rules to be followed during the population of the domain fact table with data; and,
providing a master data processing unit that processes data based on the business rules, the technical definitions and the data processing approach set up by the user interface unit.

16. A method as in claim 13, additionally comprising:
providing a user interface unit through which a user sets up technical definitions, data processing approach and business rules to be followed during the population of the domain fact table with data;
providing a master data processing unit that processes data based on the business rules, the technical definitions and the data processing approach set up by the user interface unit; and,
providing domain interface to act as a bridge between the master data processing unit and the domain fact table, the domain interface building mapping rules between the master data processing unit and the domain fact table, the domain interface also performing validations.

17. A method as in claim 13, wherein the domain fact table is one of a plurality of domain fact tables.

18. A method as in claim 13 wherein the aggregated data is obtained from an external source or from data already existing in the data warehouse and placed both in the domain fact table and the master data tables.

19. A method as in claim 13 wherein the aggregated data are arranged as key performance indicators tracked by high level management of a company.

20. A data warehouse comprising:
a plurality of master data tables, the master data tables including surrogate identifiers, each surrogate identifier (SID) identifying a master data table domain inside a master data table from the plurality of master data tables;
a domain fact table, the domain fact table storing aggregated data aggregated from data stored in the master data tables, the aggregated data being accessible from the domain fact table using surrogate identifiers, without using dimension identifiers (DIM IDs) stored in a fact table; and,
a child master data table accessible from the domain fact table.

* * * * *